J. W. SCHNABEL.
SUPPORTING FRAME.
APPLICATION FILED OCT. 18, 1913.
1,097,192.
Patented May 19, 1914.
2 SHEETS—SHEET 1.
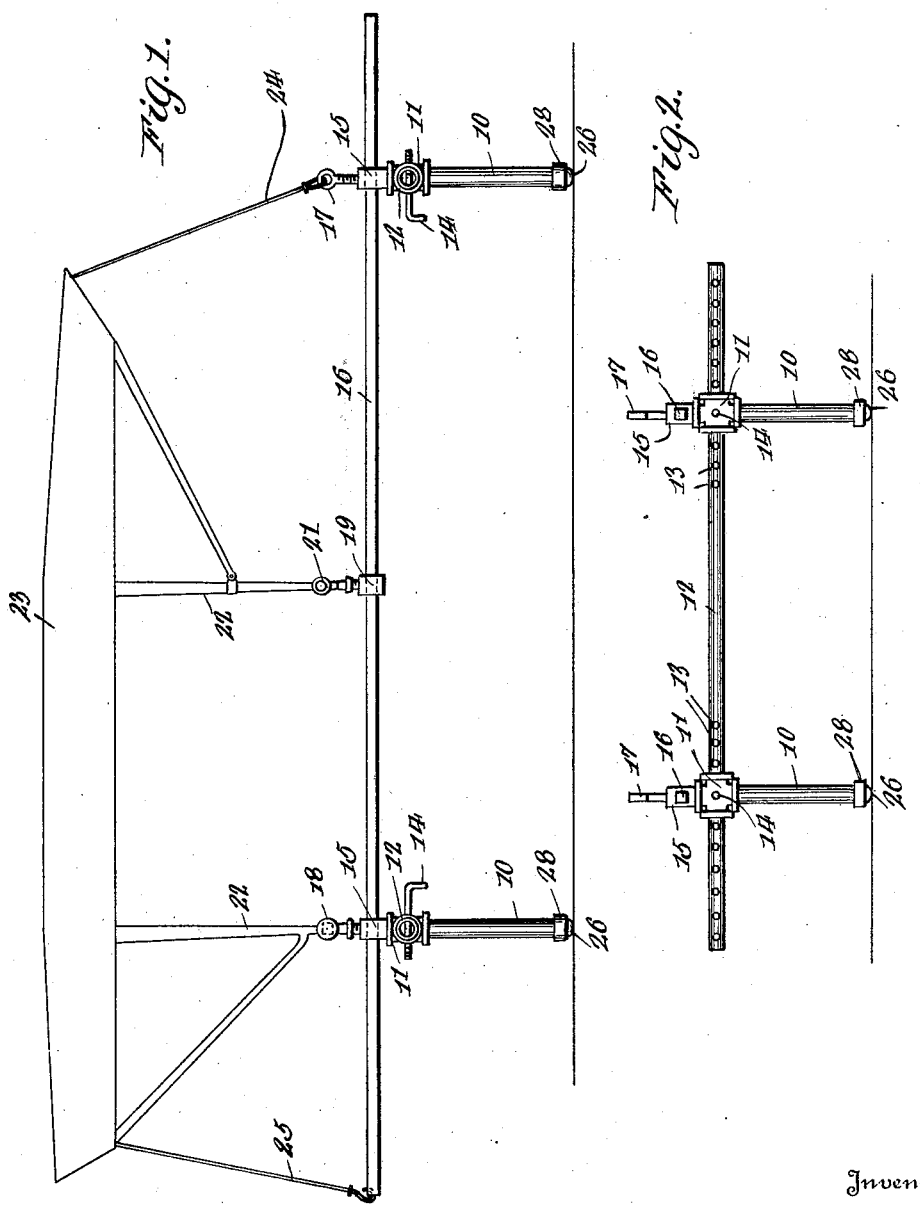

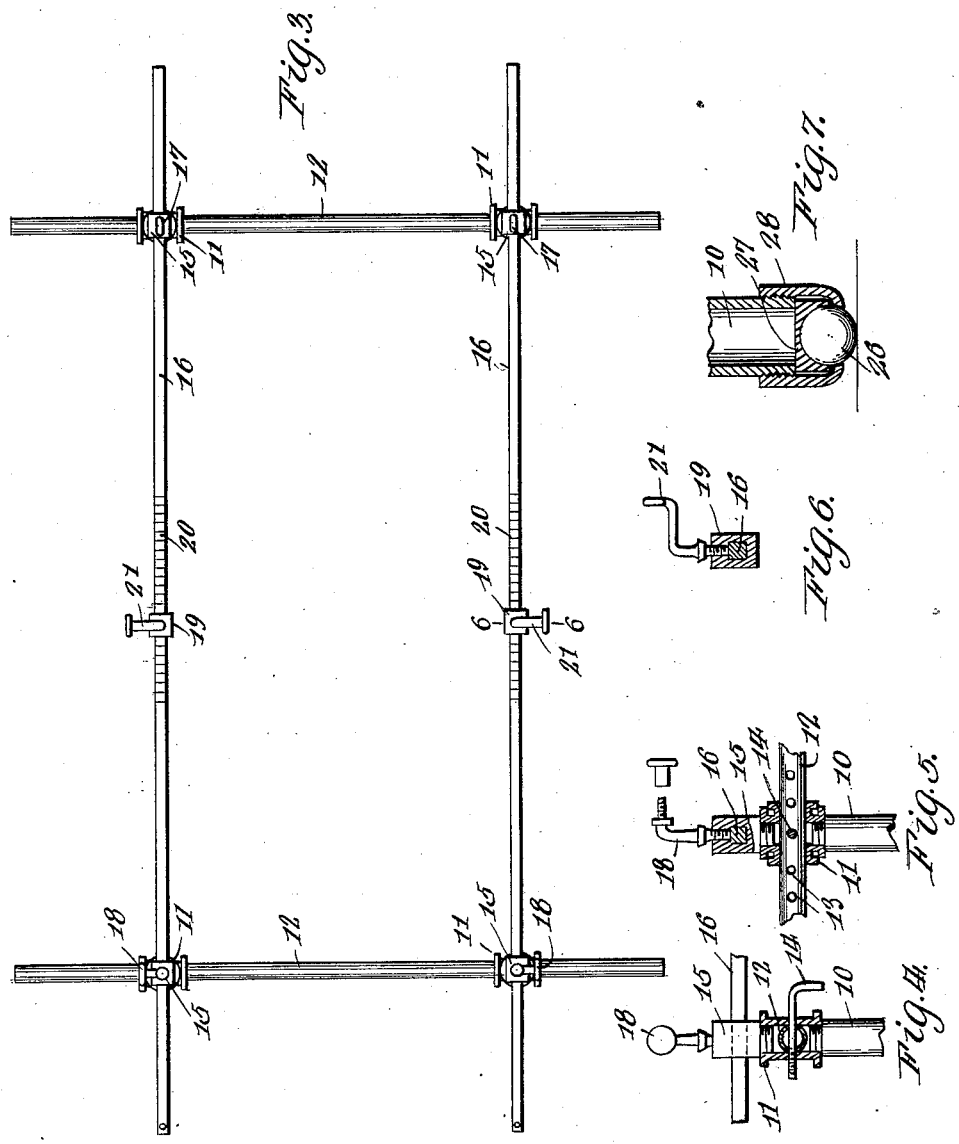

UNITED STATES PATENT OFFICE.

JAMES W. SCHNABEL, OF JOHNSTOWN, PENNSYLVANIA, ASSIGNOR OF ONE-HALF TO CHARLES F. SCHNABEL, OF JOHNSTOWN, PENNSYLVANIA.

SUPPORTING-FRAME.

1,097,192.  Specification of Letters Patent.  Patented May 19, 1914.

Application filed October 18, 1913. Serial No. 796,092.

*To all whom it may concern:*

Be it known that I, JAMES W. SCHNABEL, a citizen of the United States, residing at Johnstown, in the county of Cambria and State of Pennsylvania, have invented certain new and useful Improvements in Supporting-Frames, of which the following is a specification.

This invention relates to a supporting frame which is intended to be used for supporting the cover of an automobile or other vehicle and the principal object of the invention is to provide a frame of the type described which can be adjusted according to the size of the top.

Another object of the invention is to so construct the frame that it may be placed in a tilted position and remain in this position without any other support.

Another object of the invention is to so construct the frame that it may be very easily put together and adjusted.

Another object of the invention is to so construct the frame that it may be formed from sections of pipe and rod thus permitting the frame to be very cheaply manufactured.

This invention is illustrated in the accompanying drawings wherein:—

Figure 1 is a side elevation of the frame with an automobile top mounted thereon; Fig. 2 of an end elevation of the frame with the automobile top removed; Fig. 3 is a top plan view of the frame; Fig. 4 is a fragmentary view of one corner of the frame with the connecting sleeve shown in section; Fig. 5 is a view similar to Fig. 4 taken at right angles thereto, the upper portion being shown in section; Fig. 6 is a sectional view taken on the line 6—6 of Fig. 3; and, Fig. 7 is a sectional view through the lower end portion of one of the supporting stems.

The standards 10 are each provided with a coupling 11 at its upper end through which the transversely extending bars 12 pass. These transversely extending bars are formed from piping and are provided at their ends with the openings 13 so that pins 14 may be passed through the couplings and through the openings 13 to hold the couplings in the desired places upon the transversely extending bars and thus regulate the width of the frame. A head 15 is carried by each of the couplings 11 and these heads are provided with openings which extend at right angles to the openings through which the bars 12 pass so that the longitudinally extending bars 16 may be slidably mounted in the heads 15. These bars 16 are rectangular in cross section and are adjustably secured within the heads 15 by means of the forward eye-bolts 17 and rear pins 18. By moving the heads longitudinally upon the side bars 16, the frame may be adjusted longitudinally according to the size of the automobile top which it is desired to connect with the frame. Sleeves 19 are slidably mounted upon the side bars between the forward and rear standards and are preferably positioned in that portion of the bars which are marked with a scale as shown at 20. Pins 21 are carried by the sleeves 19 and hold these sleeves in a desired position upon the side bars. When using this frame, the supports 22 of the top 23 are connected with the pins 18 and 21 and the forward and rear straps 24 and 25 are then secured to the forward and rear portions of the frame as shown in Fig. 1. It is of course, obvious that before the automobile top is connected with the frame, the frame may be adjusted so that it will be of the proper length and width to carry the top. The lower ends of the standards carry bearings 26 which are secured in the cups 27 by means of the sleeves 28 thus permitting the frame to be moved from one place to another. When this device is not in use, the cross bars and side bars can be withdrawn from the sleeves 11 and heads 15 and the pieces of the frame can then be put in a convenient place for storage. This frame will therefore not take up much room when not in use and can therefore be kept about a shop without being in the way when not in use.

A vehicle top supporting frame has therefore been provided which can be adjusted according to the size of the top and which can be very easily taken to pieces when not in use and put together again when it is desired to use the same. It should be particularly noted that this frame may be used when building and dyeing tops, this being the principal use to which the frame will be put.

What is claimed is:—

1. A frame for supporting a vehicle top provided with supporting legs having eyes formed in their lower ends and comprising standards, cross bars adjustably connected with said standards to permit said standards to be adjusted according to the width of the vehicle top, longitudinally-extending bars carried by said standards and having their rear ends provided with openings for permitting the rear guide straps of a vehicle top to be connected with the rear ends of said bars, set screws carried by said standards and engaging said longitudinally-extending bars to releasably hold the same in an adjusted position, the upper ends of the rear set screws being bent to form fingers for passing through the eyes in the lower ends of the supporting legs of said vehicle top, means for releasably holding said pins in engagement with the legs of said top, sleeves mounted upon said longitudinally-extending bars between said forward and rear standards and provided with set screws having their upper ends bent to form pins for extending through the eyes in the forward supporting legs of said vehicle top, and the set screws carried by said forward standards having their upper ends provided with eyes for permitting the forward bracing straps of said top to be connected with said last-mentioned set screws.

2. A work-holding stand comprising a series of standards and horizontal, transverse and longitudinal bars, and means for adjustably clamping said bars to said standards to form a frame, said means including clamping screws having pin and eye heads adapted in the various adjusted positions of the standards to engage complemental parts of the work supported by the stand.

3. A work-holding stand comprising a series of standards and horizontal, transverse and longitudinal bars, means for adjustably clamping said bars to said standards to form a frame, said means including clamping screws having pin and eye heads adapted in the various adjusted positions of the standards to engage complemental parts of the work supported by the stand, and further clamping screw means having similar heads and adjustably clamping on one or more of said bars.

In testimony whereof I affix my signature in presence of two witnesses.

JAMES W. SCHNABEL.

Witnesses:
LIZZIE WIRICK,
STANLEY BLOCH.

Copies of this patent may be obtained for five cents each, by addressing the "Commissioner of Patents. Washington, D. C."